April 29, 1947.  C. F. DOUGLASS  2,419,633
PEANUT PLOW
Filed June 29, 1944  2 Sheets-Sheet 1
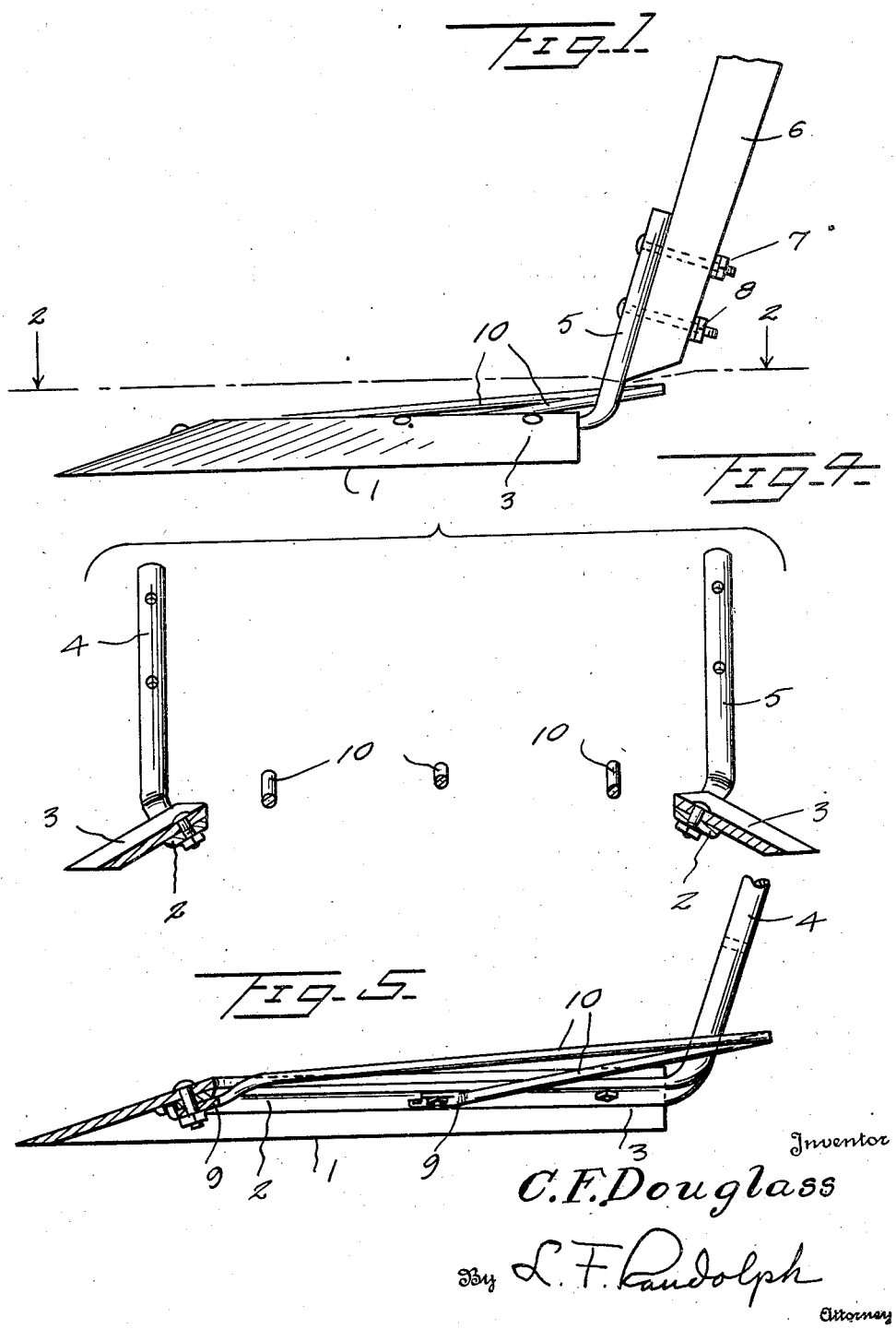

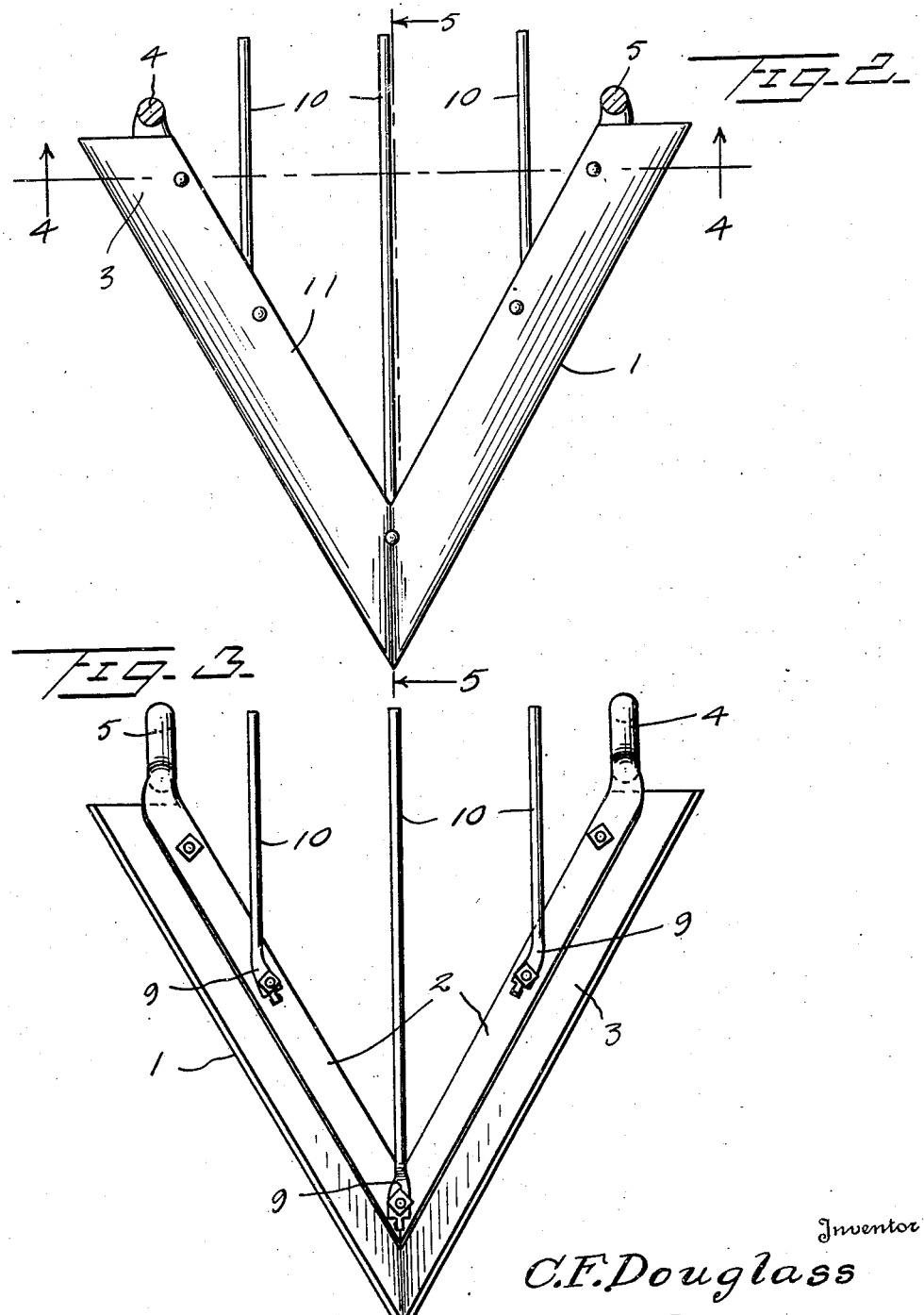

Patented Apr. 29, 1947

2,419,633

UNITED STATES PATENT OFFICE 2,419,633

PEANUT PLOW

Claude F. Douglass, Comanche, Tex.

Application June 29, 1944, Serial No. 542,641

1 Claim. (Cl. 55—54)

This invention relates to improvements in peanut plows and has for its object to provide such a plow with means for laying the vines in a row behind the plow after the shaking of the earth therefrom.

Another object of the invention is to provide a peanut plow of V-shaped construction, the frame of which is formed of a single rod flattened to receive a similarly shaped share the ends of which rod remain cylindrical and form means for attachment of a cultivator foot.

With the above and such other objects in view as may hereinafter more fully appear, I have invented the device shown in the accompanying drawings in which:

Figure 1 is a side elevation of my improved plow.

Figure 2 is a section taken on the line 2—2 of Figure 1.

Figure 3 is a bottom plan view of Figure 2.

Figure 4 is a section on line 4—4 of Figure 2; and

Figure 5 is a section on line 5—5 of Figure 2.

Like reference characters indicate like parts throughout the following specification, and in the several views in the drawings in which I indicates my improved peanut plow which consists of a base frame 2, and a plow share 3, both of which are V-shaped. The member 2 is formed of a single cylindrical metal rod which is flattened inwardly of its ends, throughout the length of the frame 2, said ends 4 and 5 remaining cylindrical and being turned up at an angle, as indicated in Figure 1, and attached to the supports 6 of a tractor (not shown), by means of bolts 7 and 8.

The frame 2 is bent at an angle to conform to a similar angle of the V-shaped share 3. Also attached to the frame 2 are a series of angularly disposed flattened ends 9 of a series of fingers 10 which, through means of said angular ends, permit the fingers to lie in a substantially horizontal plane adjacent the upper edge 11 of the plow share.

It is quite obvious that the support 6 may be either a horse drawn, or a tractor cultivator shoe, and through means of which the depth of the plowing may be readily adjusted.

Having now described my invention, that which I claim to be new and desire to procure by Letters Patent is:

In a cultivator, a digging plow including a V-shaped blade element, a correspondingly shaped frame of smaller transverse dimensions than the plow, detachable securing means between the frame and the plow, tines, said tines being secured to the middle portion of the side members of the V-shaped frame and apex thereof and lying substantially flat in a rearward direction of said frame and plow, said detachable securing means being employed to detachably secure the tines to the frame.

CLAUDE F. DOUGLASS.

REFERENCES CITED

The following references are of record in the file of this patent:

UNITED STATES PATENTS

| Number | Name | Date |
| --- | --- | --- |
| 72,552 | Shepard | Dec. 24, 1867 |
| 238,165 | Seger | Feb. 22, 1881 |
| 1,314,394 | Grimes | Aug. 26, 1919 |
| 1,261,591 | Morris | Apr. 2, 1918 |